United States Patent
Komazawa

(10) Patent No.: US 8,974,950 B2
(45) Date of Patent: Mar. 10, 2015

(54) CONNECTION STRUCTURE FOR BATTERY MODULE, BATTERY MODULE AND METHOD OF CONNECTING TERMINALS OF BATTERY MODULES

(75) Inventor: Eisuke Komazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 621 days.

(21) Appl. No.: 13/286,255

(22) Filed: Nov. 1, 2011

(65) Prior Publication Data

US 2012/0129041 A1    May 24, 2012

(30) Foreign Application Priority Data

Nov. 18, 2010   (JP) .................................. 2010-257989

(51) Int. Cl.
  *H01M 2/20*   (2006.01)
  *H01M 2/30*   (2006.01)
  *H01M 2/22*   (2006.01)
  *H01M 2/10*   (2006.01)
  *H01M 10/04*  (2006.01)

(52) U.S. Cl.
  CPC .............. *H01M 2/22* (2013.01); *H01M 2/1077* (2013.01); *H01M 2/206* (2013.01); *H01M 2/307* (2013.01); *H01M 10/0413* (2013.01); *H01M 10/0481* (2013.01)

USPC .......................................................... 429/158

(58) Field of Classification Search
  USPC ................................................. 429/121–347
  See application file for complete search history.

(56) References Cited

U.S. PATENT DOCUMENTS

| 4,053,693 | A  | * | 10/1977 | Munch et al. ................. 429/183 |
| 5,578,392 | A  | * | 11/1996 | Kawamura ...................... 429/99 |
| 2012/0115016 | A1 | * | 5/2012 | Kim .............................. 429/159 |

FOREIGN PATENT DOCUMENTS

JP     2009-2989431     12/2009

* cited by examiner

*Primary Examiner* — Kenneth Douyette
*Assistant Examiner* — James Lee
(74) *Attorney, Agent, or Firm* — Mori & Ward, LLP

(57) ABSTRACT

A connection structure for a battery module includes a fastening member and a space forming member. The fastening member presses a connecting portion of a bus bar against an electrode of the battery module to fasten the bus bar to the electrode. The space forming member has an elastic member disposed between the connecting portion of the bus bar and the electrode. The space forming member is configured to provide an insulating space between the connecting portion of the bus bar and the electrode. The elastic member is elastically deformed with a pressing force applied from the fastening member to the connecting portion of the bus bar to cancel the insulating space.

7 Claims, 6 Drawing Sheets

CONNECTION STRUCTURE FOR BATTERY MODULE, BATTERY MODULE AND METHOD OF CONNECTING TERMINALS OF BATTERY MODULES

CROSS-REFERENCE TO RELATED APPLICATIONS

The present application claims priority under 35 U.S.C. §119 to Japanese Patent Application No. 2010-257989, filed on Nov. 18, 2010, entitled "CONNECTION STRUCTURE FOR BATTERY MODULE, BATTERY MODULE AND METHOD OF CONNECTING TERMINALS OF BATTERY MODULES". The contents of this application are incorporated herein by reference in their entirety.

BACKGROUND OF THE INVENTION

1. Field of the Invention

The present invention relates to a connection structure for a battery module, a battery module and a method of connecting terminals of battery modules.

2. Discussion of the Background

A nickel hydrogen battery, a lithium ion battery, etc., which are used as power supplies for drive motors in electric vehicles, hybrid vehicles and the like, are designed to provide large power with the use of a battery pack having cells connected in series. Such a battery pack is called "battery module".

To provide greater power, battery modules are connected in series. The battery modules are electrically connected by using connecting parts called "intermodule bus bars". The intermodule bus bar is connected to an intermodule connector provided on a battery module to be connected to the battery module.

Japanese Unexamined Patent Application Publication No. 2009-289431 discloses a power supply control device for a battery pack (battery module), which facilitates bus bar wiring by achieving the optimal arrangement of battery modules and can be made compact as a whole.

According to the technique described in Japanese Unexamined Patent Application Publication No. 2009-289431, since the intermodule bus bar is exposed, short-circuiting may undesirably occur between battery modules or in a battery module when a metallic object such as a tool drops and contacts connecting portions between two battery modules at the time of assembling.

Further, according to the technique described in Japanese Unexamined Patent Application Publication No. 2009-289431, the order of mounting intermodule bus bars, a module cover, and so forth is determined, so that when the components are attached once, some component may not be replaced unless all the components are detached. This results in an increase in the number of assembling steps when wrong wiring is made, for example.

FIGS. 6A to 6C show examples of connection of a general battery module. FIG. 6A shows an example of correct connection of a battery module 1, and FIGS. 6B and 6C show examples of wrong connection of the battery module 1.

In FIGS. 6A to 6C, white circles indicate negative (−) terminals, and black solid circles indicate positive (+) terminals. Broken-line arrows indicate the directions of current.

Since the negative terminals and the positive terminals are alternately connected by intermodule bus bars $300a$ to $300c$ in FIG. 6A, individual battery modules $1a$ to $1d$ are connected in series correctly.

In the wrong connection in FIG. 6B, when the negative terminal of the battery module $1a$ is connected to the positive terminal of the battery module $1b$ by an intermodule bus bar $300d$ or a tool or the like, short-circuiting occurs between the battery module $1a$ and the battery module $1b$.

In the wrong connection in FIG. 6C, when the negative terminal of the battery module $1c$ is connected to the positive terminal of the battery module $1d$ by an intermodule bus bar $300e$, short-circuiting occurs between the battery module $1c$ and the battery module $1d$.

SUMMARY OF THE INVENTION

According to one aspect of the present invention, a connection structure for a battery module comprises a fastening member and a space forming member. The fastening member presses a connecting portion of a bus bar against an electrode of the battery module to fasten the bus bar to the electrode. The space forming member has an elastic member disposed between the connecting portion of the bus bar and the electrode. The space forming member is configured to provide an insulating space between the connecting portion of the bus bar and the electrode. The elastic member is elastically deformed with a pressing force applied from the fastening member to the connecting portion of the bus bar to cancel the insulating space. The space forming member is configured to cancel the insulating space provided between the electrode and the connection portion of the bus bar to permit electric connection between the electrode and the connecting portion of the bus bar by deforming the elastic member of the space forming member with a pressing force which increases when the electrode and the connecting portion of the bus bar are fastened by the fastening member. The space forming member is configured to provide the insulating space between the electrode and the connection portion of the bus bar to cut off electrical connection between the electrode and the connecting portion of the bus bar by restoring the deformed elastic member of the space forming member with a pressing force which decreases when the fastened electrode and the connecting portion of the bus bar are separated.

According to another aspect of the present invention, a battery module comprises a first intermodule bus bar, a first conductive member, a second conductive member, a first fastening member, a second fastening member, a first space forming member, and a second space forming member. The first intermodule bus bar connects a terminal of a first battery module including a plurality of batteries to a terminal of a second battery module including a plurality of batteries. The first conductive member is disposed between the terminal of the first battery module and the first intermodule bus bar. The second conductive member is disposed between the terminal of the second battery module and the first intermodule bus bar. The first fastening member is fixed to a receiving portion of the first battery module to couple the terminal of the first battery module, the first intermodule bus bar, and the first conductive member. The second fastening member is fixed to a receiving portion of the second battery module to couple the terminal of the second battery module, the first intermodule bus bar, and the second conductive member. The first space forming member is configured to provide a insulating space between the first conductive member and the terminal of the first battery module or between the first conductive member and the first intermodule bus bar when the first fastening member is released from the receiving portion of the first battery module. The first conductive member, the terminal of the first battery module, and the first intermodule bus bar being electrically connected together when the first fastening member is fastened to the receiving portion of the first battery module. The second space forming member is configured to provide a insulating space between the second conductive member and the terminal of the second battery module or between the second conductive member and the first intermodule bus bar when the second fastening member is released from the receiving portion of the second battery module. The second conductive member, the terminal of the second battery module, and the first intermodule bus bar is electrically connected together when the first fastening member is fastened to the receiving portion of the second battery module.

According to further aspect of the present invention, a method of connecting terminals of battery modules comprises: mounting a first space forming member configured to provide an insulating space between a first conductive member and a terminal of a first battery module or between the first conductive member and an intermodule bus; mounting a second space forming member configured to provide an insulating space between a second conductive member and a terminal of a second battery module or between the second conductive member and the intermodule bus; and fixing a first fastening member to a receiving portion of the first battery module to couple the terminal of the first battery module, the intermodule bus bar, and the first conductive member, the fixing of the first fastening member including canceling the insulating space in the first battery module using the first fastening member; and fixing a second fastening member to a receiving portion of the second battery module to couple the terminal of the second battery module, the intermodule bus bar, and the second conductive member, the fixing of the second fastening member including canceling the insulating space in the second battery module using the second fastening member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
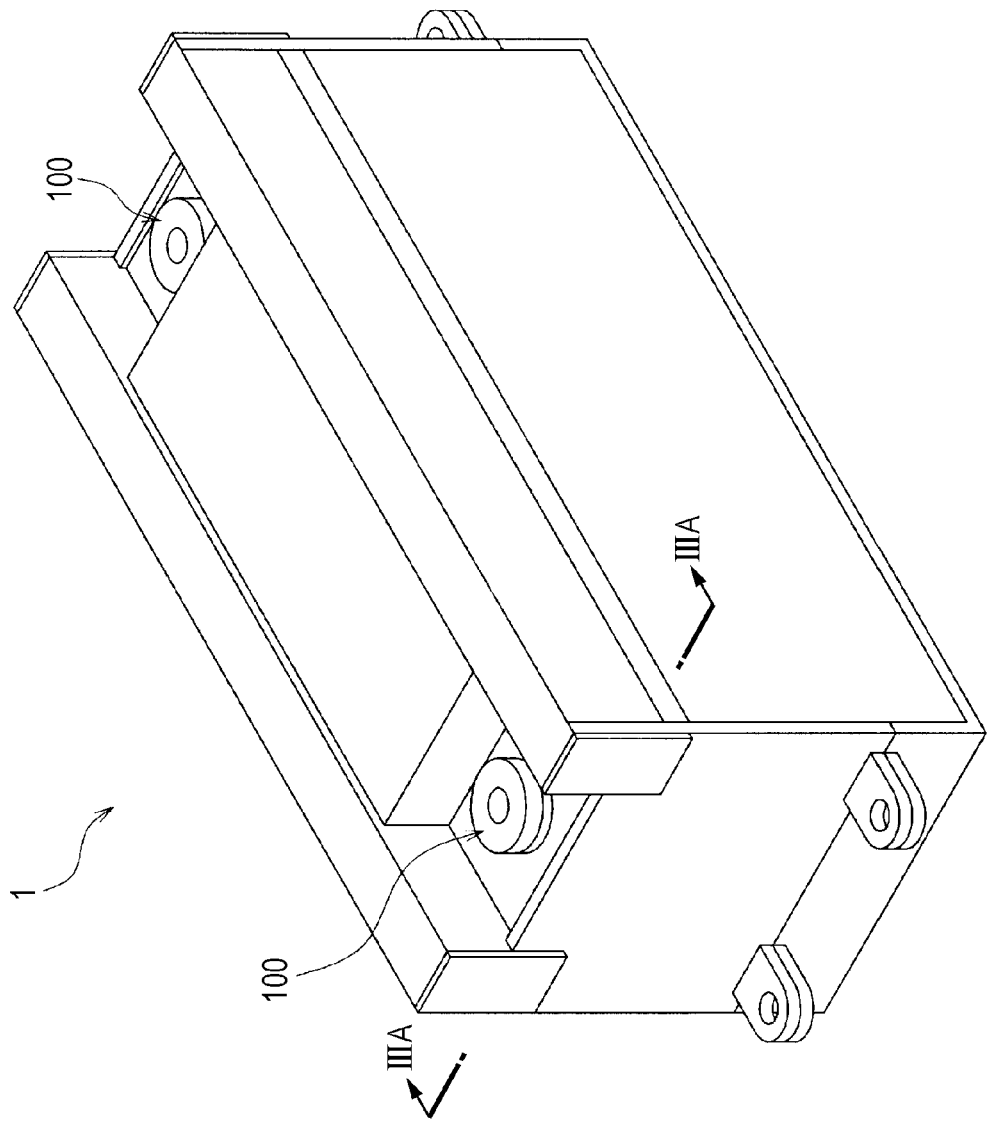
FIG. 1 is a perspective view of a battery module according to an embodiment of the invention.

The embodiments will now be described with reference to the accompanying drawings, wherein like reference numerals designate corresponding or identical elements throughout the various drawings.

Modes of working out the invention (hereinafter called "embodiments") will be described in detail with reference to the accompanying drawings. To avoid the redundant description, like or same reference numerals are given to like components in the individual diagrams.

(Perspective View of Battery Module)

FIG. 1 is a perspective view of a battery module 1 according to an embodiment of the invention.

The battery module 1 has a plurality of cells 6 (FIG. 2) electrically connected in series (hereinafter referred to as "connection") in an approximately rectangular parallelepiped case. A pair of intermodule connectors 100 are provided on both ends of the top surface of the battery module 1 respectively. The intermodule connector 100 is a terminal of the battery module 1, and has a positive (+) end and a negative (−) end as input and output ends. When a load is connected between the intermodule connectors 100 of a same module or when a positive terminal of a first battery module is connected to a negative terminal of a second battery module 1 and the negative terminal is connected to another positive terminal of a third battery module 1, a plurality of battery modules 1 are connected in series, thus providing large power.

The battery modules 1 are connected to each other by connecting metal plates called intermodule bus bars 300 (FIG. 3D) to the intermodule connectors 100.

It is desirable that the intermodule connectors 100 according to the embodiment should be provided in positions lower than the periphery of the battery module 1, or at least positions lower than the highest portion of the battery module 1, as shown in FIG. 1. The arrangement is desirable to prevent short-circuiting between the intermodule connectors 100 in the same battery module 1 or short-circuiting of the intermodule connector 100 between the battery module 1 and another battery module 1.

(Exploded Perspective View of Battery Module)

Figure 2:
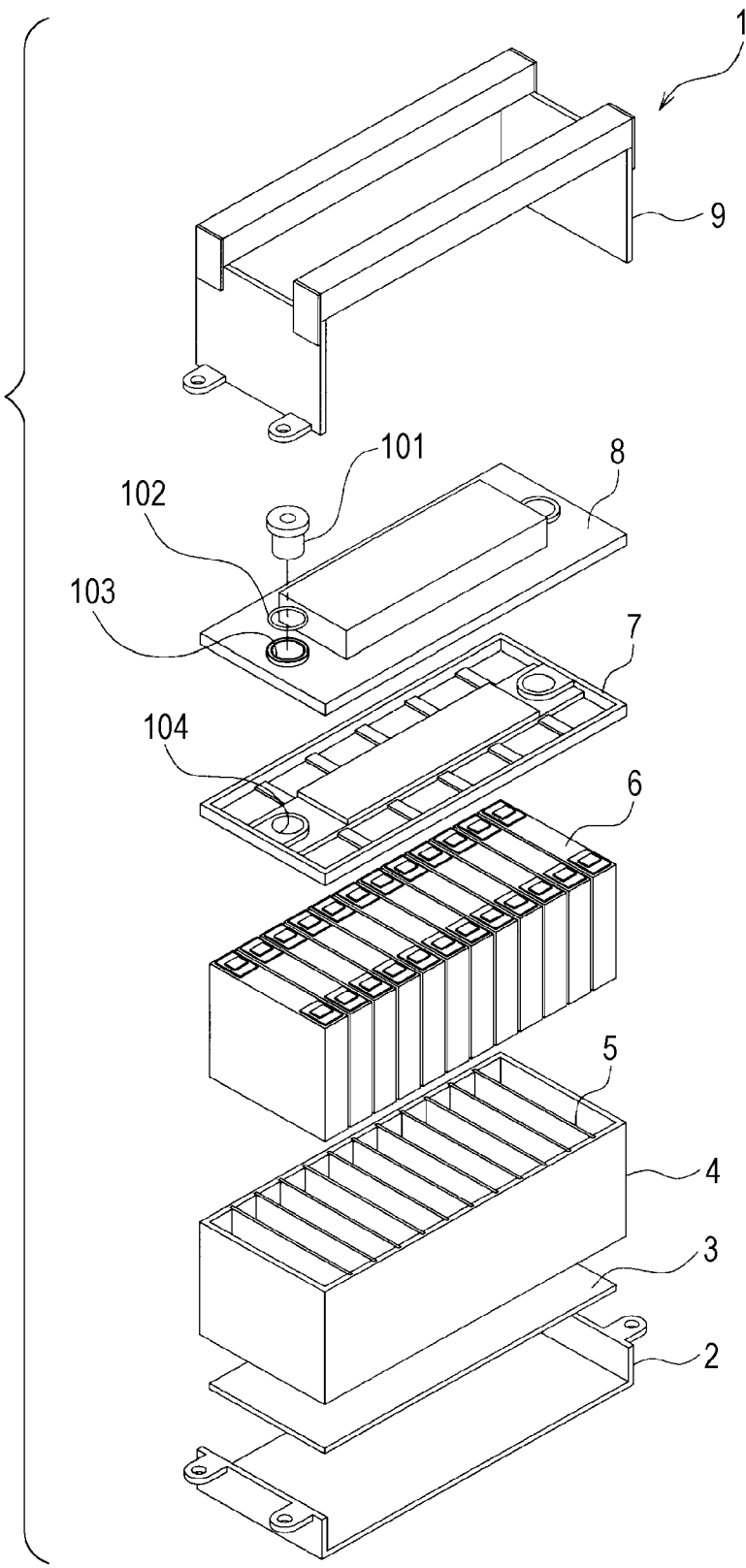
FIG. 2 is an exploded perspective view of a battery module according to the embodiment.

FIG. 2 is an exploded perspective view of the battery module according to the embodiment.

The battery module 1 according to the embodiment has a lower bracket 2 supporting the whole battery module 1 at the bottom, and a heat transfer sheet 3 provided on the top portion of the lower bracket 2 for discharging heat. A cell holder 4 which is a case for accommodating the individual cells 6 is provided on the top portion of the heat transfer sheet 3. Separators 5 to partition the cells 6 so that the cells 6 do not contact one another are disposed in, for example, grooves formed in the cell holder 4. The cells 6 are disposed between the separators 5. The cells 6 are connected in series by cell bus bars (not shown).

A bus-bar plate 7 is provided on the top portions of the cells 6 so that the cell bus bars do not contact the cells 6. A bus-bar cover 8 is provided on the top portion of the bus-bar plate 7 to protect the top portion of the battery module 1. Provided on the top portion of the bus-bar cover 8 are plate springs (not shown) for absorbing shocks of a falling object, and an upper bracket 9 which covers the plate springs and the front and rear sides of the cells 6 and is fastened to the lower bracket 2 by screws or the like to fix the whole battery module 1.

A hollow portion 103 through which a collar (conductive member) 101 forming the intermodule connector 100 (FIG. 1) penetrates is provided in the bus-bar cover 8. An O-ring (space forming member) 102 of, for example, rubber (i.e., elastic member) is fitted in a groove 108 (FIG. 3A) formed in the top portion of the hollow portion 103, and the collar 101 is inserted into the hollow portion 103 in such a way that a large-diameter portion 202 (FIG. 3B) of the collar 101 rests on the O-ring 102, thereby forming the intermodule connector 100. The details of the intermodule connector 100 will be described later.

An opening 104 where a nut to be described later is placed is provided in the bus-bar plate 7.

(Structure of Intermodule Connector)

Figure 3A:
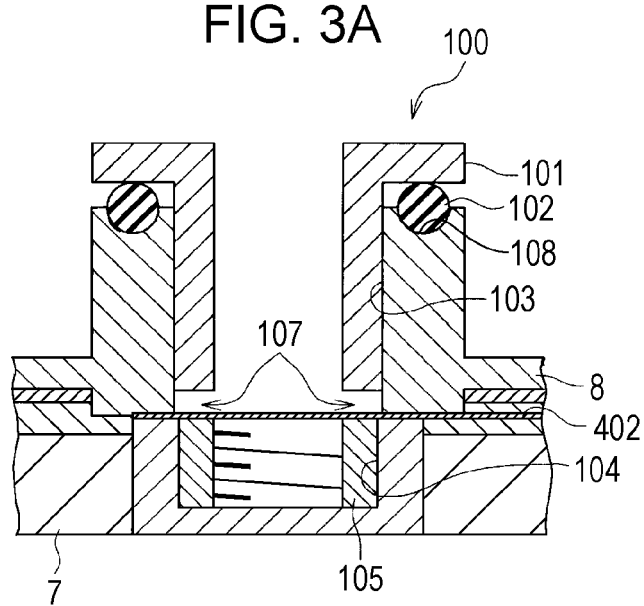
FIG. 3A is a cross-sectional view showing an intermodule connector in detail.
Figure 3B:
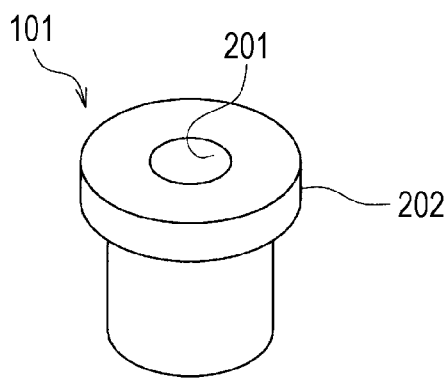
FIGS. 3B to 3D are perspective views showing a collar, an O-ring, and an intermodule bus bar, respectively.
Figure 3C:
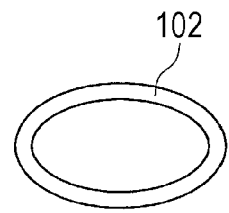
Figure 3D:
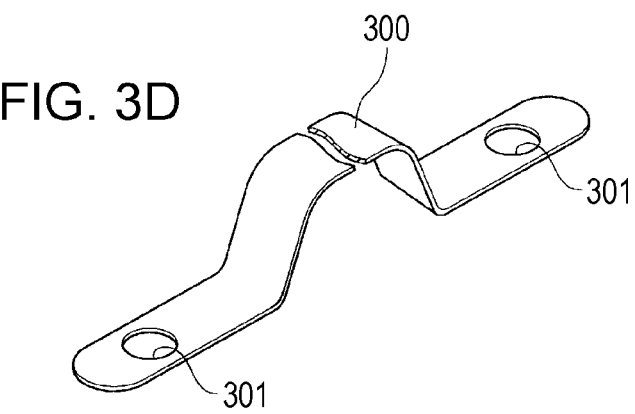

FIG. 3A is a cross-sectional view showing the intermodule connector 100 in detail along line IIIA-IIIA in enlargement, and FIGS. 3B to 3D are perspective views showing a collar, an O-ring, and an intermodule bus bar, respectively.

The intermodule connector 100 has a nut (to-be-fastened portion) 105 fitted in the opening 104 of the bus-bar plate 7, and the O-ring 102 fitted in the groove 108 formed in the top portion of the hollow portion 103 of the bus-bar cover 8, and the collar 101 placed on the O-ring 102. The collar 101 is fixed by a bolt (fastening member) 106 to be described later referring to FIGS. 4A to 4C. Before the collar 101 is fixed, a space 107 is formed between the collar 101 and the nut 105 by the O-ring 102.

A cell-module bus bar 402 which is an electrode to connect the terminal of the cell 6 (FIG. 2) to the intermodule connector 100 is placed on the nut 105.

The collar 101 is conductive, and the O-ring 102 is formed of an insulator.

As shown in FIG. 3B, the collar 101 is an approximately cylindrical part having a hollow portion 201 in the center, and the large-diameter portion 202 at the top portion.

The O-ring 102 shown in FIG. 3C is a ring-like insulating member.

FIG. 3D shows an example of the intermodule bus bar. The intermodule bus bar 300 is formed by a metal plate, and has a hole 301 which serves as a connecting portion through which the bolt 106 (FIG. 4C) is put through in association with the hollow portion 201 of the collar 101.

(Attaching Procedures)

Figure 4A:
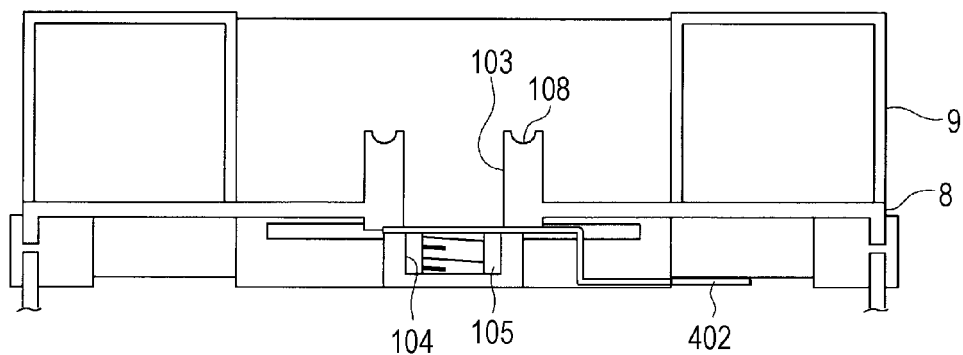
FIGS. 4A to 4C are diagrams showing procedures of attaching the intermodule connector according to the embodiment.
Figure 4B:
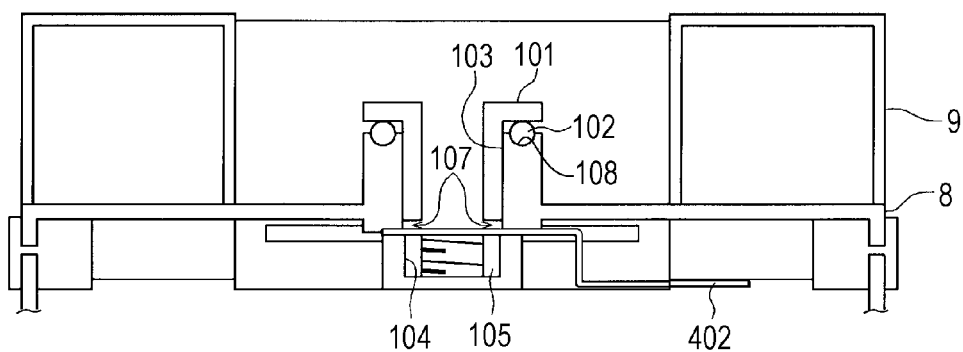
Figure 4C:
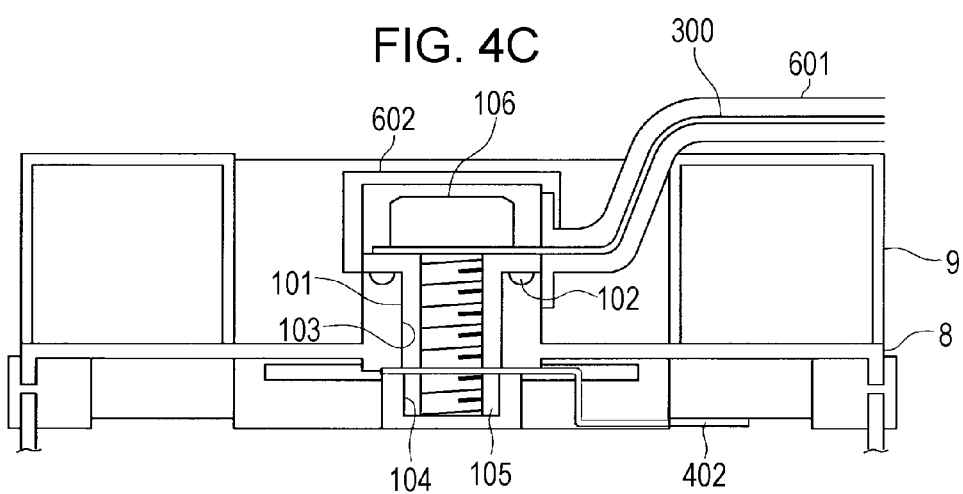

FIGS. 4A to 4C are diagrams showing procedures of attaching the intermodule connector according to the embodiment. Hatching is omitted in FIGS. 4A to 4C and FIG. 5 to avoid complication of the diagrams. FIGS. 4A to 4C show the top portion of the battery module 1 along line IIIA-IIIA in enlargement.

First, as shown in FIG. 4A, the nut 105 is fitted in the opening 104 of the bus-bar plate 7, and the cell-module bus bar 402 is placed on the nut 105. Like the intermodule bus bar 300 (FIG. 3D), the cell-module bus bar 402 which serves to connect the terminal of the cell 6 to the intermodule connector 100 is formed by a metal plate.

Next, as shown in FIG. 4B, the O-ring 102 is fitted in the groove 108 formed in the top portion of the hollow portion 103 of the bus-bar cover 8, and the collar 101 is inserted in the hollow portion 103 so that the large-diameter portion 202 (FIG. 3B) of the collar 101 is placed on the O-ring 102.

At this time, the space 107 is formed between the nut 105 and the collar 101 by the thickness of the O-ring 102 as mentioned above.

Then, the intermodule bus bar 300 is placed on the collar 101, and then the bolt 106 is inserted into the hole 301 of the intermodule bus bar 300 and the portion 201 of the collar 101 so that the hole 301 (FIG. 3D) of the intermodule bus bar 300 is aligned with the hollow portion 201 of the collar 101. When the bolt 106 is inserted into the hole 301 of the intermodule bus bar 300 and the portion 201 of the collar 101, the inserted bolt 106 is screwed into the nut 105. As a result, the O-ring 102 is pressed to cause the bottom end of the collar 101 to tightly contact the cell-module bus bar 402 as shown in FIG. 4C. Accordingly, the cell-module bus bar 402 and the intermodule bus bar 300 are electrically connected to each other.

It is desirable that the collar 101 before being fixed by the nut 105 should be located in positions lower than the periphery of the battery module 1, or at least positions lower than the highest portion of the battery module 1, as shown in FIG. 4B. This can prevent a metallic tool or the like, if dropped, from contacting the collar 101.

According to the embodiment, the whole connecting arrangement can be checked before fixing the bolt 106 (i.e., in a temporary fixed state before the collar 101 contacts the cell-module bus bar 402), so that it is possible to check again if the battery module 1 is improperly assembled. This prevents improper assembly and improves the assembling work.

Further, the O-ring 102 can improve the waterproof property.

Though details are not given here, the intermodule bus bar 300 is covered with an insulating member 601, and the top portion of the intermodule connector 100 after fixing the bolt 106 is also insulated with a cap-like insulating member 602 fitted over the top portion of the intermodule connector 100.

(Connected State of Battery Modules)

Figure 5:
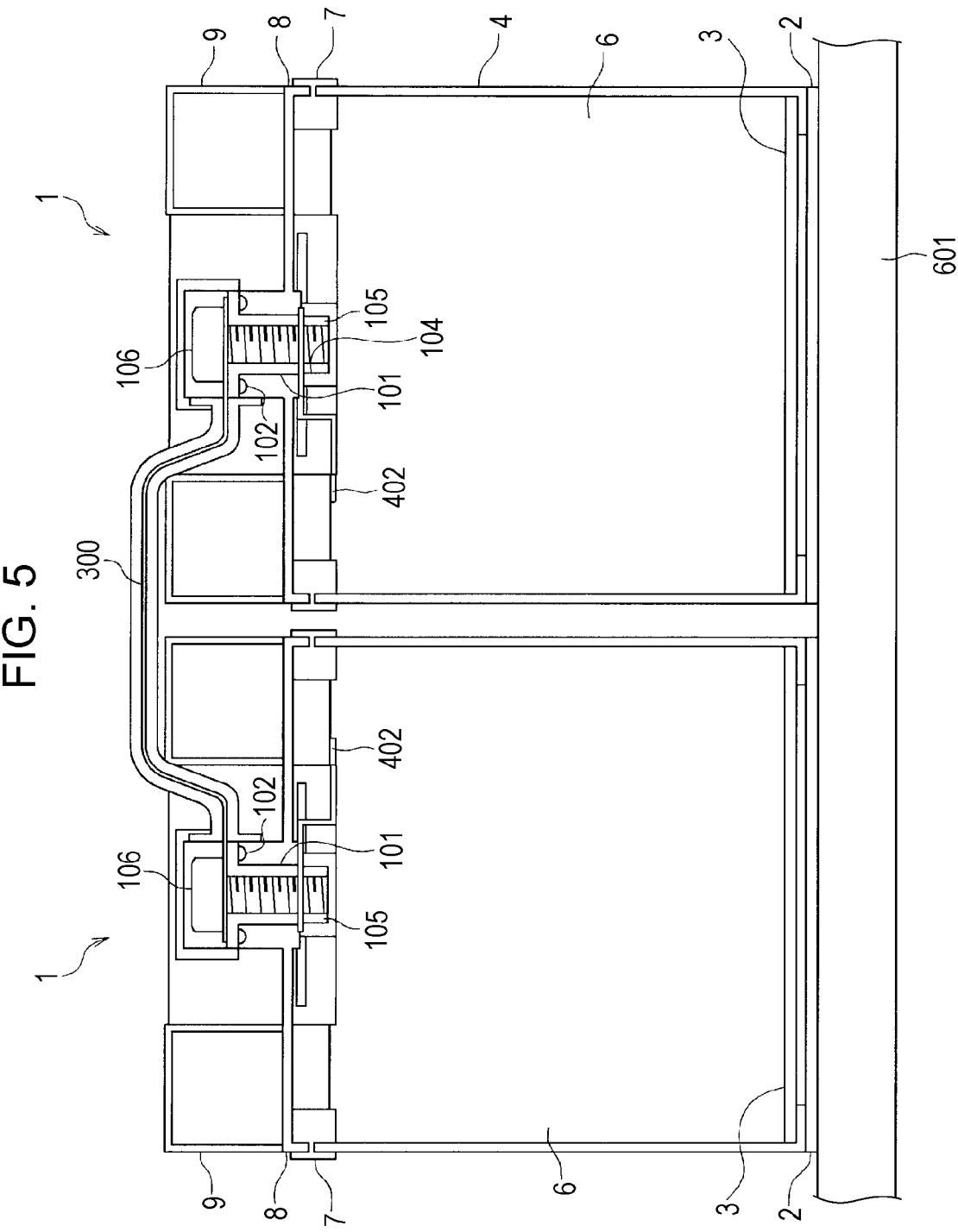
FIG. 5 is a diagram showing two battery modules connected to each other.
Figure 6A:
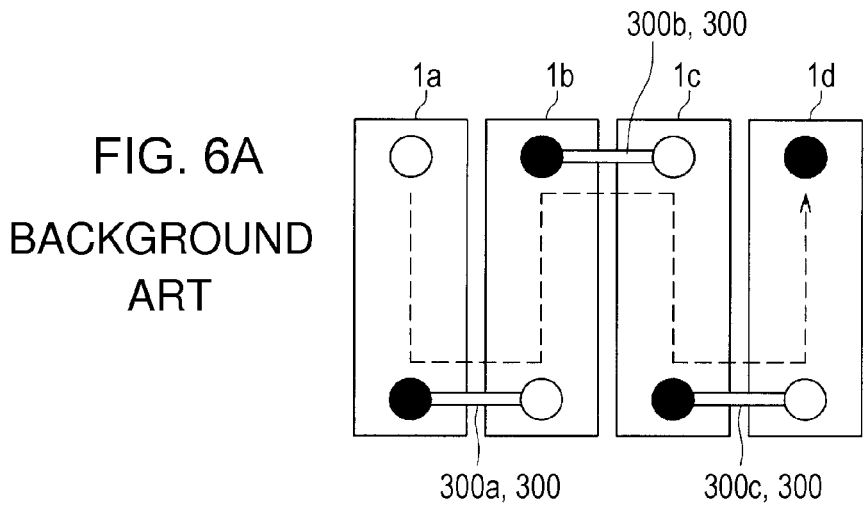
FIGS. 6A to 6C are diagrams showing examples of connection of a general battery module.
Figure 6B:
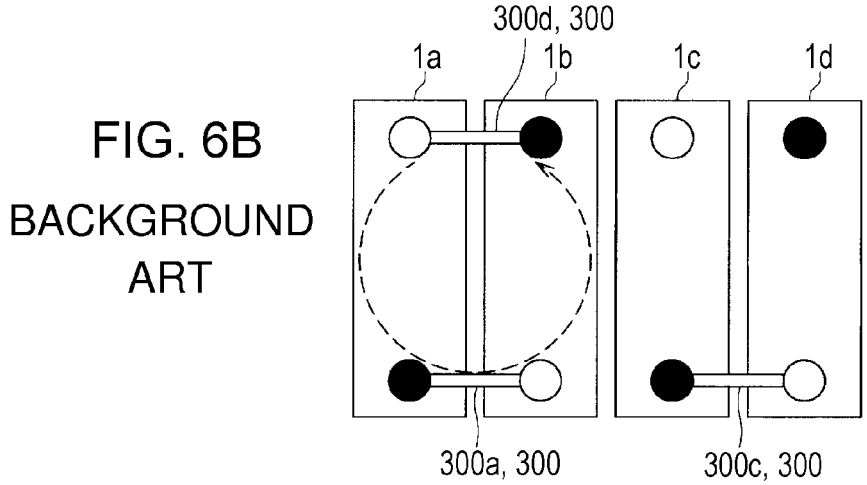
Figure 6C:
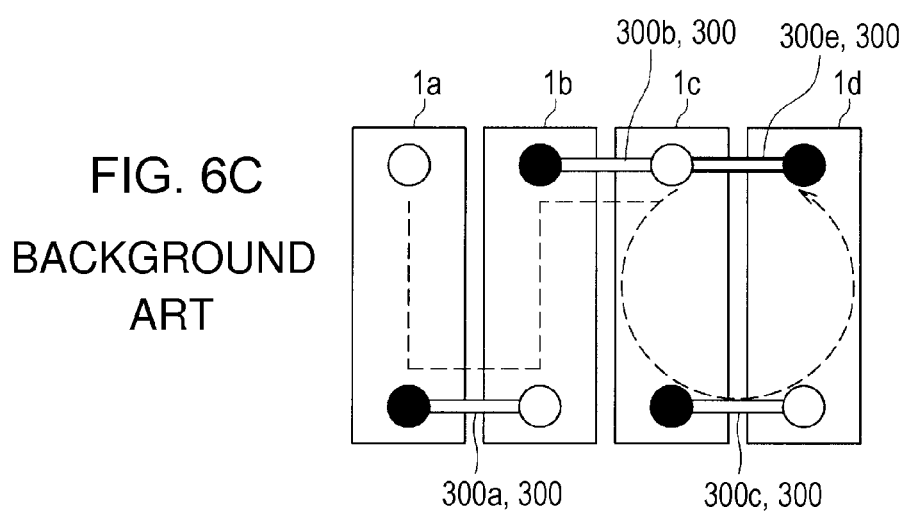

FIG. 5 is a diagram showing two battery modules connected to each other.

Each battery module 1 in FIG. 5 is equivalent to the battery module along the line IIIA-IIIA in FIG. 1.

In FIG. 5, the two battery modules 1 are electrically connected to each other with the intermodule bus bar 300 fixed as shown in FIG. 4C.

According to the embodiment, the whole connecting arrangement can be checked before fixing the bolt 106 (i.e., in a temporary fixed state before the collar 101 contacts the cell-module bus bar 402), so that it is possible to check again if the battery module 1 is improperly assembled. This prevents the aforementioned improper assembly.

In addition, according to the embodiment, as the intermodule connector 100 is provided on the battery module 1 in a position lower than at least the highest portion of the battery module 1, a conductive object can be prevented from contacting the intermodule connector 100 of the battery module 1 at the outer cover portion. This makes it possible to prevent short-circuiting between the battery modules 1 more reliably.

It is desirable that the space 107 (FIG. 4B) in the battery module 1 on the high-potential side where insulation breakdown in the air layer in the space 107 is likely to occur should be made larger than the battery module 1 on the low-potential side. This prevents insulation breakdown in the space 107. The size of the space 107 can be adjusted by adjusting the diameter or the like of the O-ring 102.

It is also desirable that the insulating space should become larger stepwise from the low-potential side toward the high-potential side in the battery module.

According to the embodiment, the battery modules 1 are disconnected from each other by merely unfastening the bolt 106, so that a failed cell 6 is easily replaced with a new one.

Although the space forming member (O-ring 102) is disposed so as to form a space between the cell-module bus bar 402 and the collar 101 according to the embodiment, this arrangement is not restrictive, and the space forming member (O-ring 102) may be disposed so as to form a space between the intermodule bus bar 300 and the collar 101. In an example of such an arrangement, an O-shaped groove may be formed in the surface of the collar 101 which the intermodule bus bar 300 contacts, and the O-ring 102 is fitted in the groove.

According to an embodiment of the invention, there is provided a connection structure for a battery module for electrically connecting a plurality of battery modules with a conductive bus bar bridging between an electrode provided on a battery module accommodating a plurality of cells and an electrode provided on another battery module, the connection structure including a space forming member having an elastic member interposed between a connecting portion of the bus bar and the electrode and forming an insulating space between the connecting portion of the bus bar and the electrode, the elastic member being elastically deformed by pressing force applied thereto to cancel the insulating space, and a fastening member that presses a connection surface of the bus bar against the electrode to fasten the bus bar to the electrode, whereby the space forming member cancels the insulating space formed between the electrode and the connection surface of the bus bar to permit electric connection therebetween by deforming the elastic member of the space forming member with the pressing force which increases when the electrode and the connecting portion of the bus bar are fastened by the fastening member, and forms the insulating space between the electrode and the connection surface of the bus bar to cut off electrical connection therebetween by restoring the deformed elastic member of the space forming member with a pressing force which decreases when the fastened electrode and the connecting portion of the bus bar are separated.

According to this embodiment of the invention, when the fastening member is not in a fastened state, the battery modules are not electrically connected to each other, thus preventing short-circuiting from being caused by a conductive object such as a metallic tool dropped on the battery modules. Further, wiring can be checked in a temporary assembly state where the fastening member is fastened to a to-be-fastened portion, so that wrong interconnection can be prevented. Furthermore, the waterproof property can be improved by canceling an insulating space by deforming the space forming member or the elastic member with pressure applied thereto.

According to an embodiment of the invention, there is provided a battery module including an intermodule bus bar that connects a terminal of a first battery module including a plurality of batteries to a terminal of a second battery module including a plurality of batteries; conductive members interposed between the terminals and the intermodule bus bar; fastening members fixed to to-be-fastened portions while coupling the terminals, the intermodule bus bar, and the conductive members; and space forming members that form insulating spaces between the conductive members and the terminals or between the conductive members and the intermodule bus bar when the fastening members are not in a fastened state, whereby the conductive members, the terminals, and the intermodule bus bar are electrically connected together when the fastening members are fastened to the to-be-fastened portions.

According to this embodiment of the invention, when the fastening member is not fastened to the to-be-fastened portion, the battery modules are not electrically connected to each other, thus preventing short-circuiting from being caused by a conductive object such as a metallic tool dropped on the battery modules. Further, wiring can be checked in a temporary assembly state where the fastening member is fastened to a to-be-fastened portion, so that wrong interconnection can be prevented.

In the battery module according to the above embodiment, the insulating space in the battery module on a high-potential side may be larger than that in the battery module on a low-potential side.

In the battery module according to the above embodiment, the space in the air layer in the battery module on the high-potential side where insulation breakdown is likely to occur can be made larger to prevent the insulation breakdown.

In the battery module according to the above embodiment, the insulating space may become larger stepwise from the low-potential side toward the high-potential side in the battery module.

According to the above battery module, when the space in the battery module on the high-potential side where insulation breakdown in the air layer in the space is likely to occur is made larger, the insulation breakdown can be prevented.

In the battery module according to the above embodiment, it is preferable that the battery module be accommodated in an outer cover member, and the conductive members be provided in positions lower than a highest portion of the outer cover member.

In this battery module, it is possible to prevent a conductive object from contacting the terminals of the battery module, so that short-circuiting between battery modules can be prevented more reliably.

In the battery module according to the above embodiment, the space forming member may be an O-ring made of rubber, and as the O-ring is pressed when the fastening member is fastened to the to-be-fastened portion, the insulating space may vanish to electrically connect the electrode, the terminal, and the intermodule bus bar.

In this battery module, the provision of the rubber O-ring to be pressed can improve the waterproof property.

According to an embodiment, there is provided a method of connecting terminals of battery modules each having an intermodule bus bar that connects a terminal of a first battery module including a plurality of batteries to a terminal of a second battery module including a plurality of batteries, the method including the steps of mounting space forming members that form spaces between the conductive members and the terminals or between the conductive members and the intermodule bus bar when fastening members are not fastened to to-be-fastened members, and fixing the fastening members to the to-be-fastened portions to cancel the spaces while coupling the terminals, the intermodule bus bar, and the conductive members.

According to this embodiment, when the fastening member is not fastened to the to-be-fastened portion, the battery modules are not electrically connected to each other, thus preventing short-circuiting from being caused by a conductive object such as a metallic tool dropped on the battery modules. Further, wiring can be checked in a temporary assembly state where the fastening member is fastened to a to-be-fastened portion, so that wrong interconnection can be prevented.

Obviously, numerous modifications and variations of the present invention are possible in light of the above teachings. It is therefore to be understood that within the scope of the appended claims, the invention may be practiced otherwise than as specifically described herein.

What is claimed is:
1. A battery assembly comprising:
  a first intermodule bus bar connecting a terminal of a first battery module including a plurality of batteries to a terminal of a second battery module including a plurality of batteries;
  a first conductive member disposed between the terminal of the first battery module and the first intermodule bus bar;
  a second conductive member disposed between the terminal of the second battery module and the first intermodule bus bar;
  a first fastening member fixed to a receiving portion of the first battery module to couple the terminal of the first battery module, the first intermodule bus bar, and the first conductive member;
  a second fastening member fixed to a receiving portion of the second battery module to couple the terminal of the second battery module, the first intermodule bus bar, and the second conductive member;

a first space forming member configured to provide an insulating space between the first conductive member and the terminal of the first battery module or between the first conductive member and the first intermodule bus bar when the first fastening member is released from the receiving portion of the first battery module, the first conductive member, the terminal of the first battery module, and the first intermodule bus bar being electrically connected together when the first fastening member is fastened to the receiving portion of the first battery module; and a second space forming member configured to provide an insulating space between the second conductive member and the terminal of the second battery module or between the second conductive member and the first intermodule bus bar when the second fastening member is released from the receiving portion of the second battery module, the second conductive member, the terminal of the second battery module, and the first intermodule bus bar being electrically connected together when the second fastening member is fastened to the receiving portion of the second battery module.

2. The battery assembly according to claim 1, wherein the first battery module is on a higher-potential side than the second battery module, and the insulating space in the first battery module is larger than the insulating space in the second battery module.

3. The battery assembly according to claim 2, wherein an insulating space in a higher-potential battery module is larger stepwise than an insulating space in a lower-potential battery module.

4. The battery assembly according to claim 1, wherein the first battery module is accommodated in a first outer cover member, and the first conductive member is provided at a lower position than a highest portion of the first outer cover member.

5. The battery assembly according to claim 4, wherein the second battery module is accommodated in a second outer cover member, and the second conductive member is provided at a lower position than a highest portion of the second outer cover member.

6. The battery assembly according to claim 1, wherein the first space forming member comprises an O-ring made of rubber, and the insulating space in the first battery module vanishes to electrically connect the first conductive member, the terminal of the first battery module, and the first intermodule bus bar by compressing the O-ring when the first fastening member is fastened to the receiving portion of the first battery module.

7. The battery assembly according to claim 6, wherein the second space forming member comprises an O-ring made of rubber, and the insulating space in the second battery module vanishes to electrically connect the second conductive member, the terminal of the second battery module, and the first intermodule bus bar by compressing the O-ring when the second fastening member is fastened to the receiving portion of the second battery module.

* * * * *